United States Patent
Awad et al.

(10) Patent No.: US 10,384,945 B1
(45) Date of Patent: Aug. 20, 2019

(54) METHOD OF PRODUCING SILICA NANOPARTICLES USING SAND

(71) Applicant: KING SAUD UNIVERSITY, Riyadh (SA)

(72) Inventors: Manal Ahmed Gasmelseed Awad, Riyadh (SA); Rabia Qindeel, Riyadh (SA); Khalid Mustafa Osman Ortashi, Riyadh (SA); Awatif Ahmed Hendi, Riyadh (SA)

(73) Assignee: King Saud University, Riyadh (SA)

( * ) Notice: Subject to any disclaimer, the term of this patent is extended or adjusted under 35 U.S.C. 154(b) by 0 days.

(21) Appl. No.: 16/271,310

(22) Filed: Feb. 8, 2019

(51) Int. Cl.
  *C03C 1/00* (2006.01)
  *C01B 33/14* (2006.01)

(52) U.S. Cl.
  CPC .......... *C01B 33/14* (2013.01); *C01P 2002/01* (2013.01); *C01P 2002/72* (2013.01); *C01P 2002/85* (2013.01); *C01P 2006/40* (2013.01)

(58) Field of Classification Search
  CPC .. C03C 1/00; C03C 1/02; C03C 1/022; C03C 1/045; C03C 3/061
  See application file for complete search history.

(56) References Cited

U.S. PATENT DOCUMENTS

| 10,100,237 B2 | 10/2018 | Lipscomb et al. |
| 2013/0321754 A1 | 12/2013 | Chien et al. |
| 2015/0344712 A1 | 12/2015 | Harrison |
| 2016/0229699 A1 | 8/2016 | Alshatwi et al. |

FOREIGN PATENT DOCUMENTS

| CN | 106118636 A | 11/2016 |

OTHER PUBLICATIONS

Improvement of Impurities Removal from Silica Sand by Using a Leaching Process, Abdelkrim Kheloufi, silicon technology development, year 2011 (Year: 2011).*
JP45-023605, 1970, see english abstract (Year: 1970).*
(Continued)

*Primary Examiner* — Melvin C. Mayes
*Assistant Examiner* — Smita S Patel
(74) *Attorney, Agent, or Firm* — Richard C. Litman

(57) ABSTRACT

A method of producing silica nanoparticles using sand can include mixing white sand with $H_2SO_4$ and $H_3PO_4$ to form a mixture. The mixture can be stirred in an ice bath. $KMnO_4$ can then be added to the mixture while maintaining the temperature of the mixture below 5° C. The resulting suspension can be reacted for about 3 hours to about 5 hours on ice. The suspension is stirred in an ice bath and then maintained in a water bath at a temperature of 40° C. for about 90 minutes to about 120 minutes. Afterwards, the temperature is adjusted to and maintained at 98° C. for another period of about 90 minutes to about 120 minutes while adding water. $H_2O_2$ can be added to the suspension after adding the water to produce a reaction product with a precipitate. The reaction product can then be dried and calcinated to provide the silica nanoparticles.

7 Claims, 4 Drawing Sheets

(56) References Cited

OTHER PUBLICATIONS

Nandanwar, R., Singh, P., & Haque, F. Z. (2015). Synthesis and characterization of SiO2 nanoparticles by sol-gel process and its degradation of methylene blue. Am. Chem. Sci, J, 5(1), 1-10.

Akl, M. A., Aly, H. F., Soliman, H. M. A., Aref, M., & ElRahman, A. (2013). Preparation and characterization of silica nanoparticles by wet mechanical attrition of white and yellow sand. J. Nanomed. Nanotechnol, 4, 183-200.

Chaudhary, A., Malik, P., Mehra, R., & Raina, K. K. (2012). Electro-optic and dielectric studies of silica nanoparticle doped ferroelectric liquid crystal in SMC* phase. Phase Transitions, 85(3), 244-254.

* cited by examiner

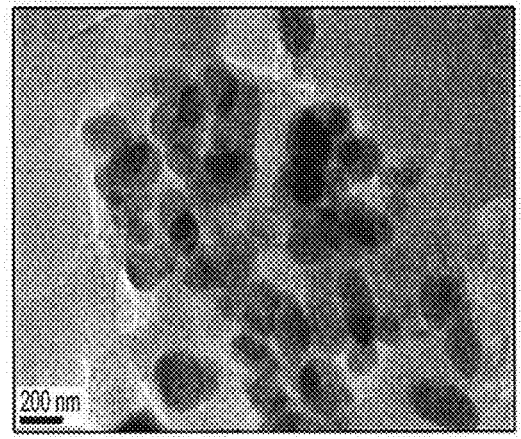
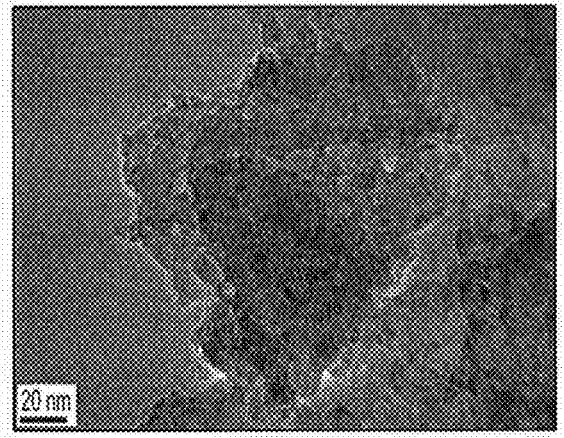
FIG. 3A   FIG. 3B
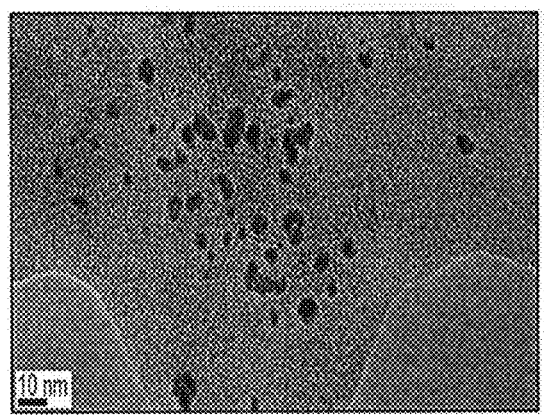
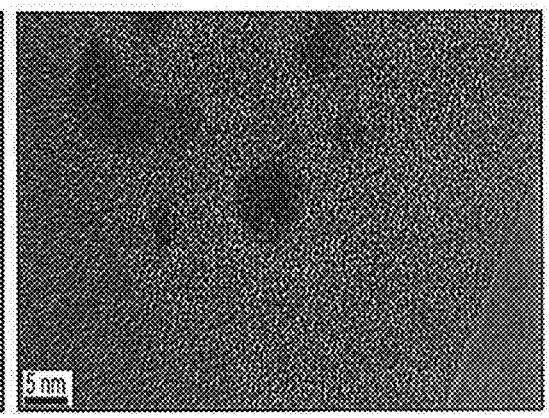
FIG. 3C   FIG. 3D

METHOD OF PRODUCING SILICA NANOPARTICLES USING SAND

BACKGROUND OF THE INVENTION

1. Field of the Invention

The disclosure of the present patent application relates to synthesis of silica ($SiO_2$) nanoparticles, and particularly to synthesis of silica ($SiO_2$) nanoparticles from white sand.

2. Description of the Related Art

Silicon dioxide ($SiO_2$) exists in many crystalline forms, including quartz, cristobalite, tridymite, stishovite and coesite, as well as amorphous forms. Crystalline $SiO_2$ has more well-defined features in the inter-band transition strength spectrum than amorphous $SiO_2$. The energy of the absorption edge for crystalline $SiO_2$ is about 1 eV higher than that of amorphous $SiO_2$.

Silica powder is widely applied in the mechanical industry, catalytic chemistry, ceramics, photo-electronics, microelectronics, and nuclear technology. Because of its electrical and dielectric properties, silica is typically used in dynamic random access memory and field effect transistors.

Thus, a method of producing silica nanoparticles using sand solving the aforementioned problems is desired.

SUMMARY OF THE INVENTION

A method of producing silica nanoparticles using sand can include mixing white sand with $H_2SO_4$ and $H_3PO_4$ to form a mixture. The mixture can be stirred under cooling conditions, e.g., in an ice bath. $KMnO_4$ can then be added to the mixture while maintaining the temperature of the mixture below 5° C. The resulting suspension can be reacted for about 3 hours to about 5 hours on ice. The suspension can be stirred in an ice bath and then maintained in a water bath at a temperature of 40° C. for about 90 minutes to about 120 minutes. Afterwards, the temperature can be adjusted to and maintained at 98° C. for another period of about 90 minutes to about 120 minutes while adding water. $H_2O_2$ can be added to the suspension after adding the water to produce a reaction product with a precipitate. The reaction product can then be dried and calcinated to provide the silica nanoparticles.

BRIEF DESCRIPTION OF THE DRAWINGS

FIG. 3A-D shows Transmission Electron Micrograph (TEM) images of the sand silica nanoparticles at 4 different scales.

Similar reference characters denote corresponding features consistently throughout the attached drawings.

DETAILED DESCRIPTION OF THE PREFERRED EMBODIMENTS

Figure 1:
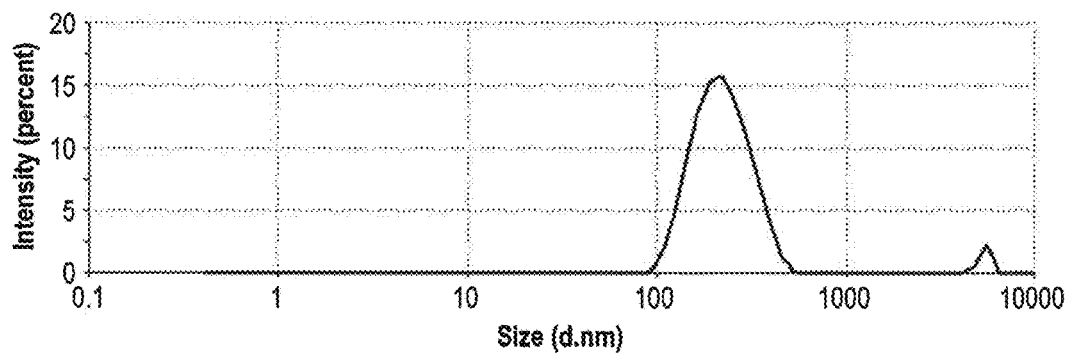
FIG. 1 shows the particle size distribution of sand silica nanoparticles produced according to an embodiment of the present specification.

A method of producing silica nanoparticles using sand can include mixing white sand with $H_2SO_4$ and $H_3PO_4$ to form a mixture. In an embodiment, a ratio of the $H_2SO_4$ to the $H_3PO_4$ in the mixture is 9:1. The mixture can be stirred in an ice bath. $KMnO_4$ can then be added to the mixture while maintaining the temperature of the mixture below 5° C. In an embodiment, about 5 grams of white sand is mixed with about 108 mL $H_2SO_4$ and about 12 mL $H_3PO_4$ to form the mixture and the mixture is stirred in the ice bath for about 15 min prior to adding about 15 grams of $KMnO_4$. After adding the $KMnO_4$, the resulting suspension can be reacted for about 3 hours to about 5 hours on ice, e.g., 3 hours. The suspension can be stirred in the ice bath and then maintained in a water bath at a temperature of 40° C. Preferably, the suspension is stirred in the 40° C. water bath for about 90 minutes to about 120 minutes. Afterwards, the temperature is adjusted to and maintained at 98° C. for another period of about 90 minutes to about 120 minutes while adding water. Water, e.g., about 120 mL to about 150 mL deionized water, can be added to the suspension continuously during this time. $H_2O_2$, e.g., about 15 mL to about 20 mL of 30% $H_2O_2$, can be added to the suspension after adding the water to produce a reaction product with a precipitate. The reaction product can be centrifuged and washed with deionized water and 5% HCl solution one or more times. The reaction product can then be dried at 80° C. and calcinated at 400° C., to provide the silica nanoparticles.

The present method of synthesizing silica nanoparticles can provide silica nanoparticles with predictable properties and in scalable quantities. The silica nanoparticles can include crystalline silica and can have an average size of approximately 266.2 nm. The silica nanoparticles morphologies can vary, ranging from near spherical to highly irregular in shape. The silica nanoparticles can have high purity. The method for producing silica nanoparticles can be useful in many fields, such as controlled release application, sensor devices, electronics, catalysis, and dielectric materials. As sand is an abundant resource, the present methods are particularly desirable for synthesizing silica nanoparticles.

It should be understood that the amounts of materials for the methods described herein are exemplary, and appropriate scaling of the amounts are encompassed by the present subject matter, as long as the relative ratios of materials are maintained. As used herein, the term "about," when used to modify a numerical value, means within ten percent of that numerical value. The present teachings are illustrated by the following examples.

Example 1

Silica Nanoparticle Synthesis

Commercial white sand was collected from a fire extinguishing sand pail. 5 g of the white sand was mixed with 108 mL $H_2SO_4$ and 12 mL $H_3PO_4$ to form a mixture. The mixture was stirred in an ice bath for 15 min. 15 g of $KMnO_4$ was then slowly added to the mixture while maintaining the temperature of the mixture below 5° C. The resulting suspension was then reacted for 3 h in an ice bath, stirred for 90 min on ice, and then stirred in a 40° C. water bath for an additional 90 min. The temperature of the mixture was adjusted to a constant 98° C. for a further 90 min, while water was added continuously. Deionized water was further added to achieve a suspension volume of 400 mL. 15 mL of $H_2O_2$ was added 5 min after the deionized water, producing a reaction product with a precipitate. The reaction product was centrifuged and washed with deionized water and 5% HCl solution repeatedly. Finally, the reaction product was dried at 80° C. and then calcinated at 400° C., resulting in exemplary silica nanoparticles.

Example 2

Silica Nanoparticle Characterization

The size distribution of the exemplary silica nanoparticles was measured by a Zetasizer (Nano-series, HT Laser, ZEN3600; Molvern Instrument, UK), as shown in FIG. 1. The average size of the exemplary silica nanoparticles was found to be 266.2 nm.

Figure 2:
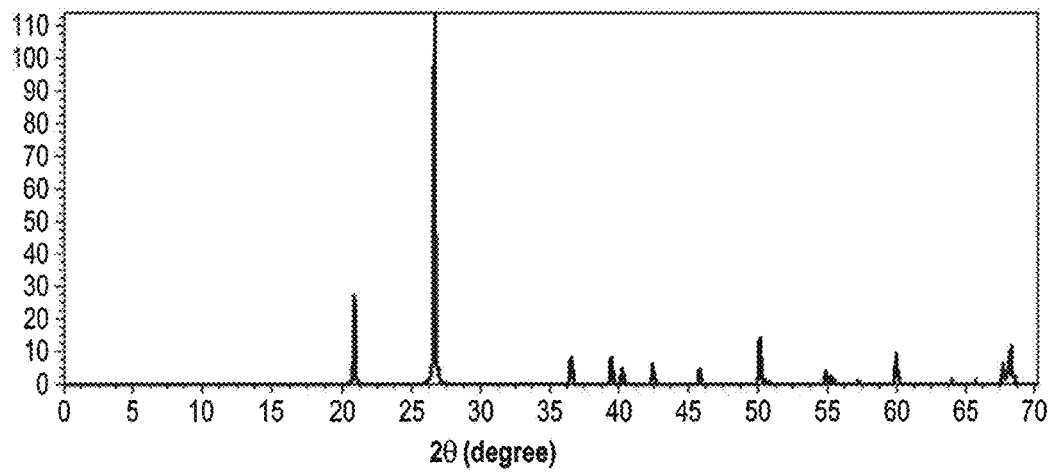
FIG. 2 shows an X-ray Diffraction (XRD) pattern of the sand silica nanoparticles.

Results from X-ray diffraction (XRD) (X'Pert PRO PANalytical) analysis are shown in FIG. 2. The XRD pattern of the exemplary silica nanoparticles shows a typical silica characteristic of a sharp peak at $2\theta=26°$, which confirms that the sample is crystalline silica.

The exemplary silica nanoparticles were characterized by transmission electron microscopy (TEM) (JEM-2100F). TEM images of exemplary silica nanoparticles are shown in FIGS. 3A-3D. The exemplary silica nanoparticles morphologies are variable, ranging from near spherical to highly irregular in shape.

Figure 4:
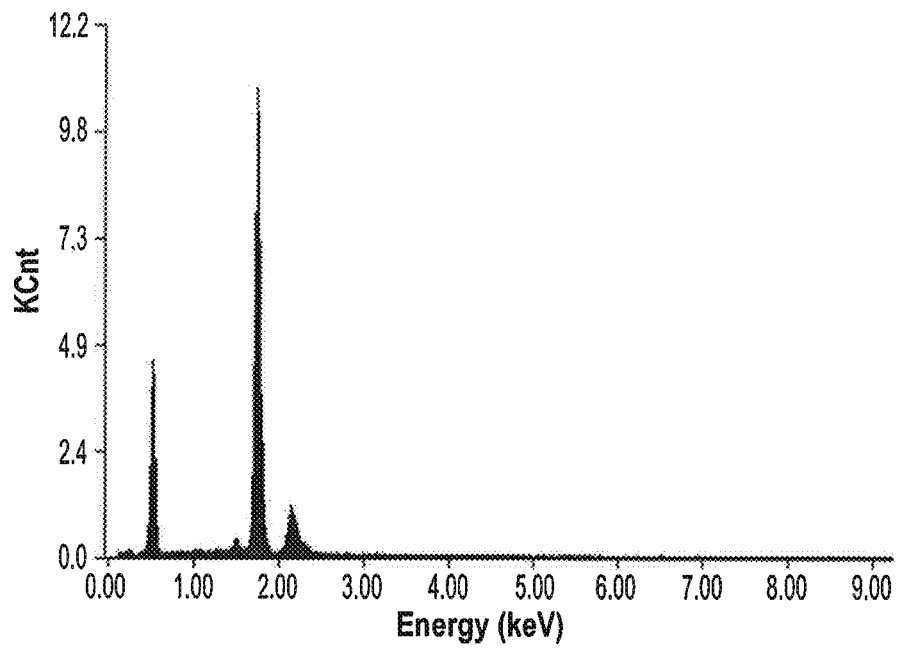
FIG. 4 shows an Energy Dispersive X-Ray Spectroscopy (EDS) analysis of the elements content in the prepared sand silica nanoparticles sample.

Elemental analysis was performed on exemplary silica nanoparticles using Energy-dispersive spectroscopy (EDS). FIG. 4 shows peaks consistent with that of silicon and oxygen.

Figure 5:
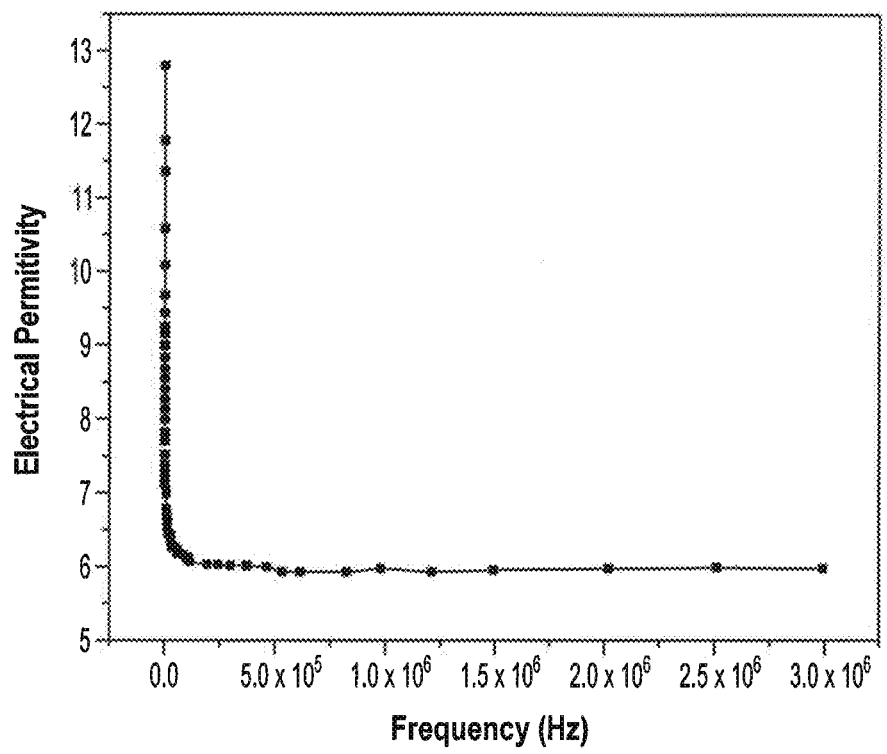
FIG. 5 shows the relative permittivity $\varepsilon'$ as a function of applied frequency for the sand silica nanoparticles.
Figure 6:
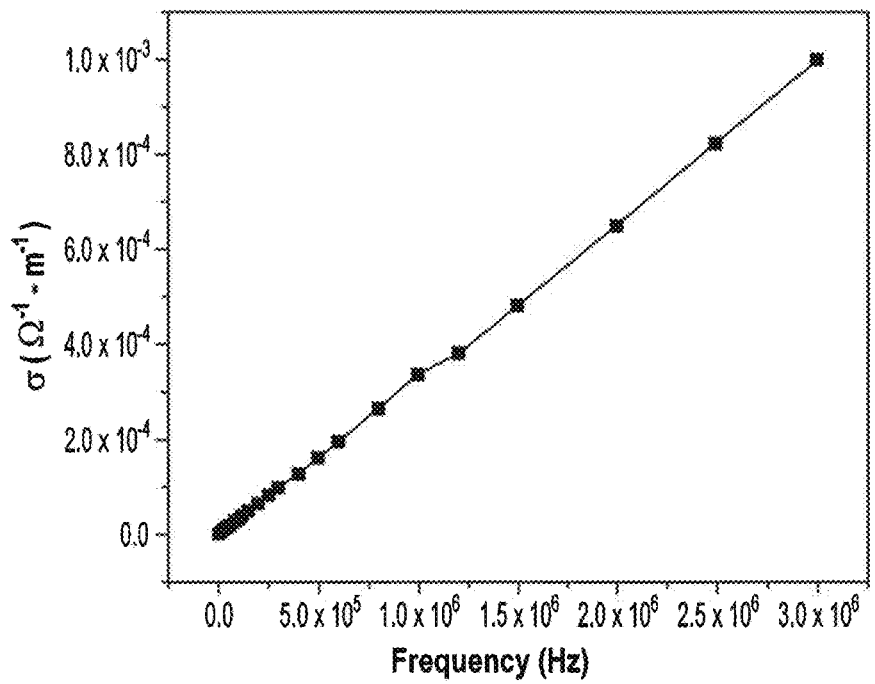
FIG. 6 shows the electrical conductivity ($\sigma$) of the sand silica nanoparticles as a function of applied frequency.
Figure 7:
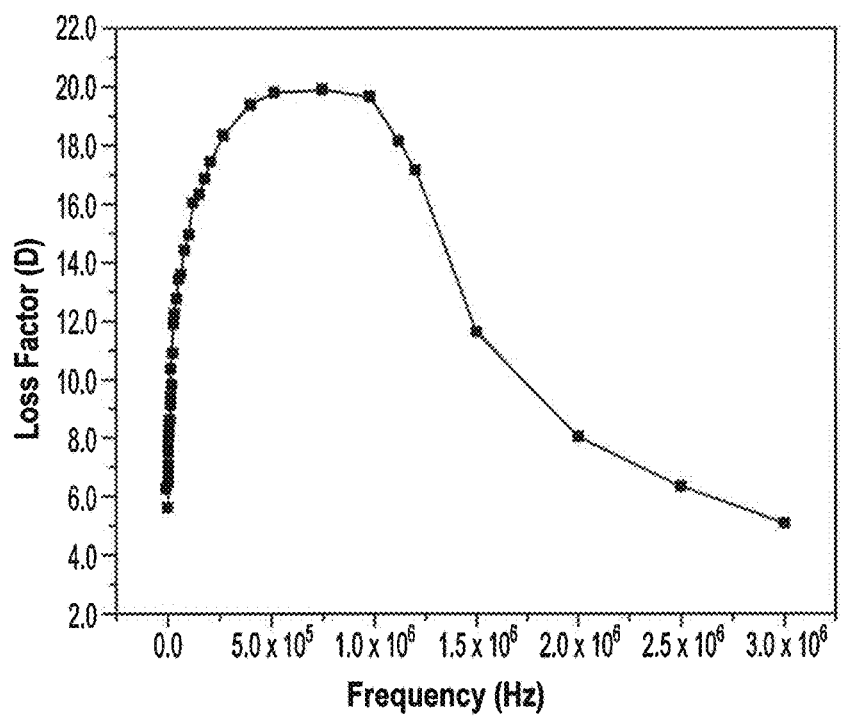
FIG. 7 shows the loss factor (tan $\delta$) of the sand silica nanoparticles as a function of applied frequency.

FIGS. 5-7 show the variation of electrical permittivity and conductivity with a frequency range of 20 Hz to 3 MHz at room temperature for $SiO_2$. FIG. 5 shows the relative permittivity $\varepsilon'$ as a function of applied frequency for the sand silica nanoparticles. FIG. 6 shows the electrical conductivity ($\sigma$) of the sand silica nanoparticles as a function of applied frequency. FIG. 7 shows the loss factor (tan $\delta$) of the sand silica nanoparticles as a function of applied frequency. The dielectric data indicates that the exemplary $SiO_2$ nanoparticles have strong dielectric dispersion corresponding to the alpha relaxation region in the frequency range of 20 Hz to 100 kHz, which appears as an anomalous frequency dispersion.

A rapid decrease in the dielectric constant may be attributed to the tendency of dipoles in the $SiO_2$ to orient themselves in the direction of the applied field in the low frequency range. However, in the high-frequency range, the dipoles are less easily oriented in the direction of the applied field. Hence, the value of the dielectric constant is nearly constant at the high-frequency range. The measured conductivity values increase monotonically with increasing frequency.

Moreover, at high frequencies, the conductivity values rapidly increase for the exemplary silica nanoparticles. The variation of loss factor as a function of frequency for the exemplary silica nanoparticles is shown in FIG. 7, which shows a relaxation process. The relaxation time was found to increase with increase in frequency until a maximum value of tan $\delta$ loss is obtained. A fall in loss factor tan $\delta$ occurs with further increase in frequency.

It is to be understood that the method of producing silica nanoparticles is not limited to the embodiments described above, but encompasses any and all embodiments within the scope of the following claims.

We claim:

1. A method of producing silica nanoparticles using sand comprising:
   mixing sand with $H_2SO_4$ and $H_3PO_4$ to provide a mixture;
   adding $KMnO_4$ to the mixture under ice cooling conditions to provide a suspension;
   stirring the suspension for a first period of time under the cooling conditions;
   stirring the mixture for a second period of time under warming conditions while adding water;
   adding $H_2O_2$ to the mixture to produce a precipitate;
   isolating the precipitate; and
   drying and calcining the isolated precipitate to obtain the silica nanoparticles.

2. The method of producing silica nanoparticles using sand according to claim 1, wherein a ratio of the the $H_2SO_4$ and the $H_3PO_4$ is 9:1.

3. The method of producing silica nanoparticles using sand according to claim 1, wherein the cooling conditions include temperatures below 5° C.

4. The method of producing silica nanoparticles using sand according to claim 1, wherein the warming conditions include temperatures ranging from about 40° C. to about 98° C.

5. The method of producing silica nanoparticles using sand according to claim 1, wherein the step of isolating comprises centrifuging the mixture and rinsing the precipitate with water and HCl solution.

6. The method of producing silica nanoparticles using sand according to claim 1, wherein the step of drying and calcinating comprises drying at about 80° C. and calcinating at about 400° C.

7. The method of producing silica nanoparticles using sand according to claim 1, wherein the first period of time and the second period of time ranges from about 90 minutes to about 120 minutes.

* * * * *